Feb. 10, 1931.  V. M. CAVE ET AL  1,792,412
SLIDE HOLDER OPERATOR
Filed March 28, 1929
Fig.1.
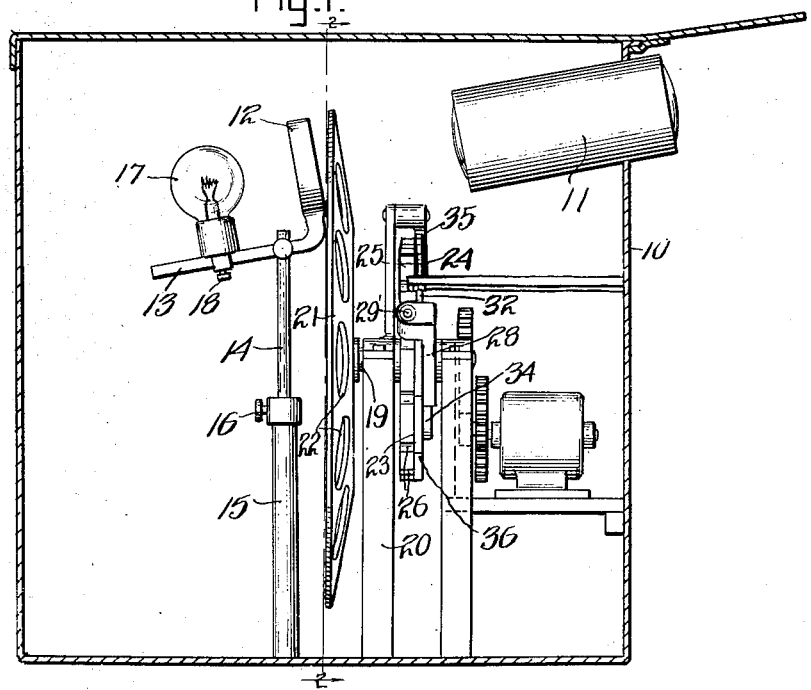
Fig.2.
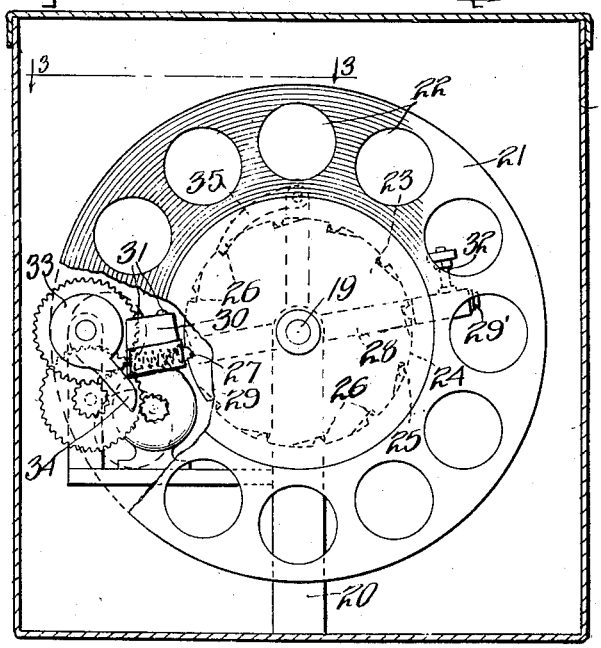
Fig.3.
Inventors
Victor M. Cave
Samuel T. Matthews
Attorney Patented Feb. 10, 1931

1,792,412

UNITED STATES PATENT OFFICE

VICTOR M. CAVE AND SAMUEL T. MATTHEWS, OF METZ, CALIFORNIA

SLIDE-HOLDER OPERATOR

Application filed March 28, 1929. Serial No. 350,681.

Our invention relates to stereopticon projectors, and more particularly to means for operating the rotary slide support; and it is an object of the invention to provide improved operating means for rotating the support intermittently, which operating means is not only of simplified construction but one which produces a more rapid change from one slide to another; all as will be hereinafter more particularly described and claimed.

Referring to the accompanying drawings, which are made a part hereof and on which similar reference characters indicate similar parts, Figure 1 is a side elevation illustrating one application of our invention, Figure 2, a rear elevation of the slide holder operating mechanism taken on line 2—2 of Fig. 1, and Figure 3 is a top plan view taken on a line 3—3 of Fig. 1.

In the drawings reference character 10 indicates the housing of a projector having a pair of spaced lenses 11 and 12 mounted therein, both of which lenses are adjustable. The lens 12 is pivotally supported by means of a bracket 13 on the vertically adjustable rod 14 slidable in an upright base 15 and adapted to be secured in fixed position in the base by means of a set screw 16. The bracket 13 has a lamp 17 adjustable longitudinally of the same, and which furnishes a light for the projector, said lamp being adapted to be secured in fixed relation by a set screw 18.

A relatively short shaft 19 is supported by means of a stanchion or the like 20, and on the rear end of this shaft is fixed a rotatable slide support in the form of a disc or wheel 21 provided with perforations 22 spaced around its periphery in a position to be brought between the lenses 11 and 12 for permitting the light to shine through the said lenses and the perforation 22 in the disc. The slide support is provided with any desired means for securing the lenses in place over the perforations, said perforations being adapted to have different signs, pictures, colored plates or the like secured thereover in a manner to be projected.

One important feature of our invention is the provision of means for rotating the shaft 19 upon which the slide support is mounted, said means comprising an actuating disc 23 provided with a pair of peripheries of large and small diameters 24 and 25 respectively, or of uniform diameters if desired. The periphery 24 is provided with uniformly spaced curved depressions 26 which are adapted to be engaged by an operating ball 27 on each end of an operating lever 28 mounted loosely on the shaft, each ball 27 being pressed against the periphery of the actuating disc by means of a spring 29. A weight 30 is mounted on one end of the lever 28 by means of bolts or rivets 31, and said weight serves to maintain its respective end normally in its lowermost position.

In order to limit the oscillatory movement of the lever 28 an adjustable stop 32 is provided which is supported from the frame of the machine. The springs 29 are maintained within the ends of the lever by means of cap screws 29'. Means is provided for oscillating the lever which in the present instance comprises a rotary wheel or body 33 provided with an operating finger 34, the rotary body and finger forming in effect a cam which when they are rotated oscillate the bar 28 which upon its return movement actuates by gravity the rotary actuating disc 23. Said rotary actuating disc 23 is prevented from reverse rotation by means of a gravity operated pawl or finger 35 which drops into notches 36 in the periphery 24 of said disc. The rotation of the cam wheel 33 and cam finger 34 carried thereby will intermittently oscillate the bar, and the actuating disc 23 associated therewith will be operated by the movement of the bar under the influence of the weight 30.

The length of time of exposure of any particular view on the slide support 21 will be controlled by the speed or rotation of the cam wheel 33 which moves the cam 34 into engagement with the lever 28 which will raise the same, and the ball catches 27 will engage or move into the next set of notches or depressions 26 in the actuating disc 23. As soon as the cam 34 passes from beneath the lever 28 change of exposure occurs. The weight 30 on the lever 28 will cause it to fall to its normal depressed position at the same time turning with it the disc 23 and the slide holding disc 21, which will bring the next slide to exposed position between the lenses 11 and 12. The stop post 32 will stop the lever 28 in the proper position with the opening in the slide support 21 between the lenses 11 and 12. The length of time required to change from one exposure to another is practically negative, the change being made almost instantaneously. The only time required is for the lever 28 to fall from raised position to its normal depressed position simultaneously turning the disc 23 and 21. For example, if the cam 34 makes four revolutions per minute there will be a change of exposure every revolution, which will be every fifteen seconds.

In this structure there is avioded all complicated mechanism that is likely to give trouble by getting out of order, and the operation will be more distinct and satisfactory, requiring only a small amount of power to rotate the cam wheel 33 and associated parts, such for example as may be furnished by an electric motor.

It will be obvious to those skilled in the art that various changes may be made in our device without departing from the spirit of the invention, and we, therefore, do not limit ourselves to what is shown in the drawings and described in the specification, but only as set forth in the appended claim.

Having thus fully described our said invention, what we claim as new and desire to secure by Letters Patent, is:—

Operating means for a rotary slide holder comprising a shaft, a disk on said shaft having openings therein to receive the slides, a notched disk and a ratchet disk on said shaft, a normally balanced bar loosely mounted on said shaft, a weight on one end of said bar for depressing it, a travel limiting means adjacent the other end of said bar, spring pressed means on both ends of said bar for engaging the notches in said notched disk, a gravity pawl for engaging said ratchet disk, and continuously rotating means for rocking said bar to advance said slide holding disk one notch at a time, substantially as set forth.

In witness whereof, we have hereunto set our hands at Soledad, California this 7 day of March, A. D. nineteen hundred and twenty-nine.

VICTOR M. CAVE.
SAMUEL T. MATTHEWS.